United States Patent Office 2,362,858

SOLVENTS FOR ORGANIC FILM-FORMING MATERIALS

Walter Reppe and Otto Hecht, Ludwigshafen-on-the-Rhine, and Fritz Oschatz, Mannheim, Germany, assignors, by mesne assignments, to General Aniline & Film Corporation, New York, N. Y., a corporation of Delaware No Drawing. Application May 17, 1941, Serial No. 393,929. In Germany February 18, 1938

5 Claims. (Cl. 260—29)

This application is a continuation in part of our application Ser. No. 255,217, filed February 8, 1939, entitled "Solvents for organic film-forming materials," on which U. S. Patent 2,255,229 was issued September 9, 1941.

This invention relates to solvents for organic film-forming materials, especially those applicable to the manufacture of plastic masses, lacquers, priming compositions, covering colors, adhesives, foils, films, bands or artificial threads.

We have found that tetrahydrofurane and certain of its alkyl substitution products have an excellent solvent power for organic film-forming resinous substances obtained by the condensation of organic compounds which artificial resins are used as basic substances for lacquers and other plastic masses. They are also compatible with other ingredients in commercial use in the preparation of lacquers, as for example with softening agents, plasticizers and the like.

The tetrahydrofuranes used as solvents according to our invention have the following formula:

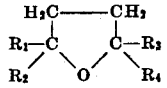

in which $R_1$, $R_2$, $R_3$ and $R_4$ are hydrogen or low molecular aliphatic hydrocarbon radicals. The most simple member of this series is tretrahydrofurance itself, which is miscible both with water and with organic solvents, as for example with aromatic hydrocarbons and, therefore, is a very desirable solvent in the preparation of compositions of matter and plastic compositions. By the selection of the alkyl substituents in the tetrahydrofurane radicle it is possible to vary the solvent capacity, volatility, water-solubility of the substance according to desire. Suitable alkyl substitution products are for example 2.5-dimethyltetrahydrofurane and 2.2.5.5-tetramethyltetrahydrofurane.

Tetrathydrofurane is suitable for example for dissolving synthetic resins, as for example those obtained by condensation of formaldehyde with various organic substances, e. g. phenol-aldehyde resins, urea-formaldehyde resins, etherified urea-formaldehyde resins, such as are obtained for example by condensation of urea with formaldehyde or of dimethylol urea in alcohols, formaldehyde-amine resins, condensation products of polybasic acids with polyhydric alcohols, e. g. those prepared from phthalic acid and glycerol, trimethylolpropane, erythrit, pentaerythrit, if desired in the presence of other organic compounds, such as monocarboxylic acids of the drying and non-drying series and natural resin acids or their esters, condensation products of resin acids or their esters with maleic acid, furthermore synthetic resins obtained by the condensation of aldehydes or ketones, e. g. cyclohexanone resins. In addition to these resinous condensation products, the solutions may contain cellulose derivatives, i. e. cellulose esters, as for example nitrocellulose and organic cellulose esters, cellulose ethers, as for example ethyl or benzyl cellulose, cellulose ether esters, and also rubber and rubber-like substances, as for example polymerized isoprene or butadiene, their chlorination products and also rubber isomerisation products.

Since tetrahydrofurane may also be used for dissolving synthetic vinyl polymerization products, such as polyvinyl chloride, polyvinyl esters or organic acids, as for example polyvinyl acetate, polyvinyl ethers, polyvinyl carbazole, and also polyacrylic acid and polymethacrylic acid and their derivatives an interpolymerization products of different vinyl compounds, these film-forming materials may also be added to the solutions according to our invention. Tetrahydrofurane also has a good solvent power for the waxes and drying oils used in the preparation of lacquers, as for example linseed oil, wood oil, oiticica oil or root oil, and also for the fundamental substances used in the preparation of asphalt lacquers.

The solutions thus prepared may have added to them the usual softening agents and also to a large extent adulterants. Many of the dyestuffs used for coloring lacquers also have a good solubility in tetrahydrofuranes. Insoluble organic or inorganic fillers may, however, also be added to the lacquers.

The use of tetrahydrofurane as a solvent is very advantageous. It is stable and colorless, thereby being suitable for the production of clear or light colored lacquers and plastic compositions. It will be obvious from the foregoing explanations that it is possible according to our present invention to vary the properties of the compositions within very wide limits, and to fulfill all requirements of practice, for example the hardness, the time required for drying and the like.

The following examples will further illustrate how this invention may be carried out in practice, but the invention is not restricted to these examples. The parts are by weight.

*Example 1*

30 parts of a resin of the Resol type prepared by condensation of 1 molecular proportion of cresol with 1.25 molecular proportions of formaldehyde with the addition of ammonia as a condensing agent are dissolved in 50 parts of tetrahydrofurane and 20 parts of butyl acetate to give a clear lacquer. After evaporation of the solvent it yields a lacquer film of good course which can be hardened by burning in for 2 hours at 120° C. to give a hard resin which is resistant to acid.

When importance is attached to rapid evaporation of the solvent, the resin capable of being hardened may be dissolved in tetrahydrofurane alone.

Example 2

30 parts of a resinous condensation product obtained by the condensation of 1 molecular proportion of para-tertiary-butyl-phenol with 2 molecular proportions of formaldehyde and caustic soda solution according to the German specification No. 340,989 are heated for 15 minutes with 90 parts of Chinese wood oil at from 215° to 225° C. The resulting lacquer body is cooled to about 100° C., 40 parts of test benzine (boiling range 150° to 180° C.) are added and, after further cooling, 40 parts of tetrahydrofurane are added. The oil lacquer thus obtained yields, after application, coatings which dry much more rapidly and with considerably better course than those in which test benzine alone has been used as the solvent. Instead of the abovementioned resin, there may also be used the other resins used in oil lacquer technique, and linseed oil, stand oil, oiticica oil may be used instead of wood oil.

Example 3

30 parts of the synthetic resin obtained by esterifying with glycerol the condensation product of colophony with maleic acid anhydride and 2 parts of polyvinyl ethyl ether are dissolved in 68 parts of tetrahydrofurane. The solution thus obtained may be colored with mineral or organic pigment dyestuffs, e. g. iron oxide red, titanium dioxide, zinc sulfide or the azo dyestuff 1-methyl-5-nitrobenzene-azo-2-hydroxynaphthalene. It dries rapidly and may be used for coating wood.

Example 4

35 parts of the resinous condensation product prepared from pentaerythrit and phthalic acid anhydride are dissolved in 65 parts of tetrahydrofurane, while adding from 3 to 5 parts of a suitable softening agent, e. g. dibutyl phthalate. The colorless lacquer obtained dries rapidly. It may be used for coating wood.

Instead of tetrahydrofurane, there may also be used 2.5-dimethyl tetrahydrofurane.

What we claim is:

1. A composition of matter comprising an organic film-forming resinous formaldehyde condensation product dissolved in a compound of the formula

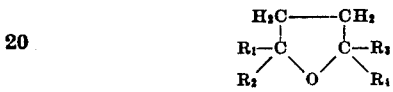

wherein $R_1$, $R_2$, $R_3$ and $R_4$ each represent a substituent selected from the group consisting of hydrogen and methyl.

2. A composition of matter comprising a film-forming resinous formaldehyde condensation product dissolved in tetrahydrofurane.

3. A composition of matter comprising a film-forming resinous phenol-formaldehyde condensation product dissolved in tetrahydrofurane.

4. A composition of matter comprising a film-forming resinous formaldehyde condensation product dissolved in 2.5-dimethyl tetrahydrofurane.

5. A composition of matter comprising a film-forming resinous formaldehyde condensation product dissolved in 2.2.5.5-tetramethyl tetrahydrofurane.

WALTER REPPE.
OTTO HECHT.
FRITZ OSCHATZ.